(12) United States Patent
Chiu

(10) Patent No.: US 8,448,596 B2
(45) Date of Patent: May 28, 2013

(54) DEVICE FOR SENSING GAP VARIATION

(75) Inventor: Johnny J. T. Chiu, Hsichih (TW)

(73) Assignee: Valentine International Ltd., Hsichih (TW)

( * ) Notice: Subject to any disclaimer, the term of this patent is extended or adjusted under 35 U.S.C. 154(b) by 594 days.

(21) Appl. No.: 12/792,215

(22) Filed: Jun. 2, 2010

(65) Prior Publication Data

US 2011/0297074 A1 Dec. 8, 2011

(51) Int. Cl.
*G01D 11/24* (2006.01)
*G06M 1/248* (2006.01)
*G01B 3/22* (2006.01)

(52) U.S. Cl.
USPC .......................................... 116/285; 73/866.1

(58) Field of Classification Search
CPC ............ G01D 11/24; G06M 1/248; G01B 3/22
USPC .................. 116/305, 271, 274, 276, 284, 292, 116/298, 299, 304, 307, 285, 212, 225; 356/9; 33/833, 834, 836, 613; 411/13, 383, 384; 73/81, 866.1, 866.3, 866.5
See application file for complete search history.

(56) References Cited

U.S. PATENT DOCUMENTS

| | | | | |
|---|---|---|---|---|
| 2,400,371 | A * | 5/1946 | Reeser .............................. | 33/836 |
| 2,673,464 | A * | 3/1954 | Zublin ........................ | 73/862.53 |
| 3,142,287 | A * | 7/1964 | Jones ............................. | 116/206 |
| 3,247,824 | A * | 4/1966 | Rodgers ........................ | 116/271 |
| 3,479,743 | A * | 11/1969 | Zemberry ....................... | 33/836 |
| 3,498,114 | A * | 3/1970 | Garber et al. .................... | 73/649 |
| 3,975,959 | A * | 8/1976 | Larkin ............................ | 73/744 |
| 4,217,849 | A * | 8/1980 | Brown et al. ................. | 116/212 |
| 4,345,380 | A * | 8/1982 | Vis ................................... | 33/784 |
| 4,369,728 | A * | 1/1983 | Nelson .......................... | 116/276 |
| 4,409,842 | A * | 10/1983 | Scott et al. ..................... | 73/800 |
| 4,419,900 | A * | 12/1983 | Scott et al. ................. | 73/862.06 |
| 4,606,129 | A * | 8/1986 | Barrowman et al. ...... | 33/501.09 |
| 5,067,250 | A * | 11/1991 | Auweiler et al. .............. | 33/783 |
| 5,094,009 | A * | 3/1992 | Koch et al. ...................... | 33/834 |
| 5,289,729 | A * | 3/1994 | Tsunoda et al. ............. | 73/866.1 |
| 5,551,162 | A * | 9/1996 | Struble .......................... | 33/548 |
| 6,536,263 | B1* | 3/2003 | Wood et al. ....................... | 73/82 |
| 6,553,840 | B2* | 4/2003 | Fournier et al. ................ | 73/718 |
| 7,437,919 | B1* | 10/2008 | Wu ................................. | 73/146 |
| 7,637,227 | B2* | 12/2009 | Stradella et al. ............. | 116/307 |
| 2009/0284758 | A1* | 11/2009 | Kuwata ......................... | 356/614 |

* cited by examiner

*Primary Examiner* — Peter Macchiarolo
*Assistant Examiner* — Tania Courson
(74) *Attorney, Agent, or Firm* — Guice Patents PLLC

(57) ABSTRACT

A sensing device includes a cover having a window; a seat comprising a bottom first opening, a peripheral wall, a recess on the wall, and a bottom channel; a spring biased sliding unit comprising a bottom projection fitted in the first opening, a probe extending from the projection, a hollow cylinder, and two opposite cavities on a periphery; a cylindrical rotational unit comprising a rim extending inward from an inner surface, a second opening on the rim, a display plate on the rim, and two opposite guide protrusions on an inner surface opposing the display plate wherein indications are printed on the display plate, and the rotational unit is rotatably put on the sliding unit with the cylinder passing through the rim, the display plate being rested on the recess, and the guide protrusions being engaged with the cavities; and a biasing member retained on the cylinder.

1 Claim, 3 Drawing Sheets

US 8,448,596 B2

DEVICE FOR SENSING GAP VARIATION

BACKGROUND OF THE INVENTION

1. Field of Invention

The invention relates to measurement devices and more particularly to a device having a mechanism which allows an individual to determine whether there is a gap variation between a subject object adhered to the device and an object to be sensed by viewing pattern, indicia, or color change through a window thereon.

2. Description of Related Art

Distance (or gap) variation between one member and another member is an important factor of determining whether a potential structural failure exists. Thus, how to precisely measure such variation is a critical issue to be addressed.

Displacement of one component relative to the other component can be found in bridge structures, buildings, etc. For safety purposes, a precise measurement of any displacements should be carried out.

Typical device for sensing gap variations are disadvantageous because they are either insensitive or imprecise when a longitudinal variation is converted into a transverse variation for visual judgment. Thus, the need for improvement still exists.

SUMMARY OF THE INVENTION

It is therefore one object of the invention to provide a sensing device comprising a cover having a window; a seat assembled with the cover and comprising a bottom first opening, a peripheral wall, a recess on the wall, and a bottom channel; a sliding unit comprising a bottom projection fitted in the first opening, a probe extending from the projection, a hollow cylinder, and two opposite cavities on a periphery; a cylindrical rotational unit comprising a rim extending inward from an inner surface, a second opening on the rim, a display plate on the rim, and two opposite guide protrusions on an inner surface opposing the display plate wherein indications are printed on the display plate, and the rotational unit is rotatably put on the sliding unit with the cylinder passing through the rim, the display plate being rested on the recess, and the guide protrusions being engaged with the cavities; a first biasing member disposed in the cylinder; and a second biasing member put on the cylinder and having one end fastened in the second opening and the other end fastened in the channel; wherein a gap variation between the seat and a point being in contact with the probe can cause the first spring to expand to push the sliding unit further away from the cover and move the guide protrusions along the cavities, thereby rotating the rotational unit with the indications viewed through the window being changed.

The above and other objects, features and advantages of the invention will become apparent from the following detailed description taken with the accompanying drawings.

DETAILED DESCRIPTION OF THE INVENTION

Figure 1:
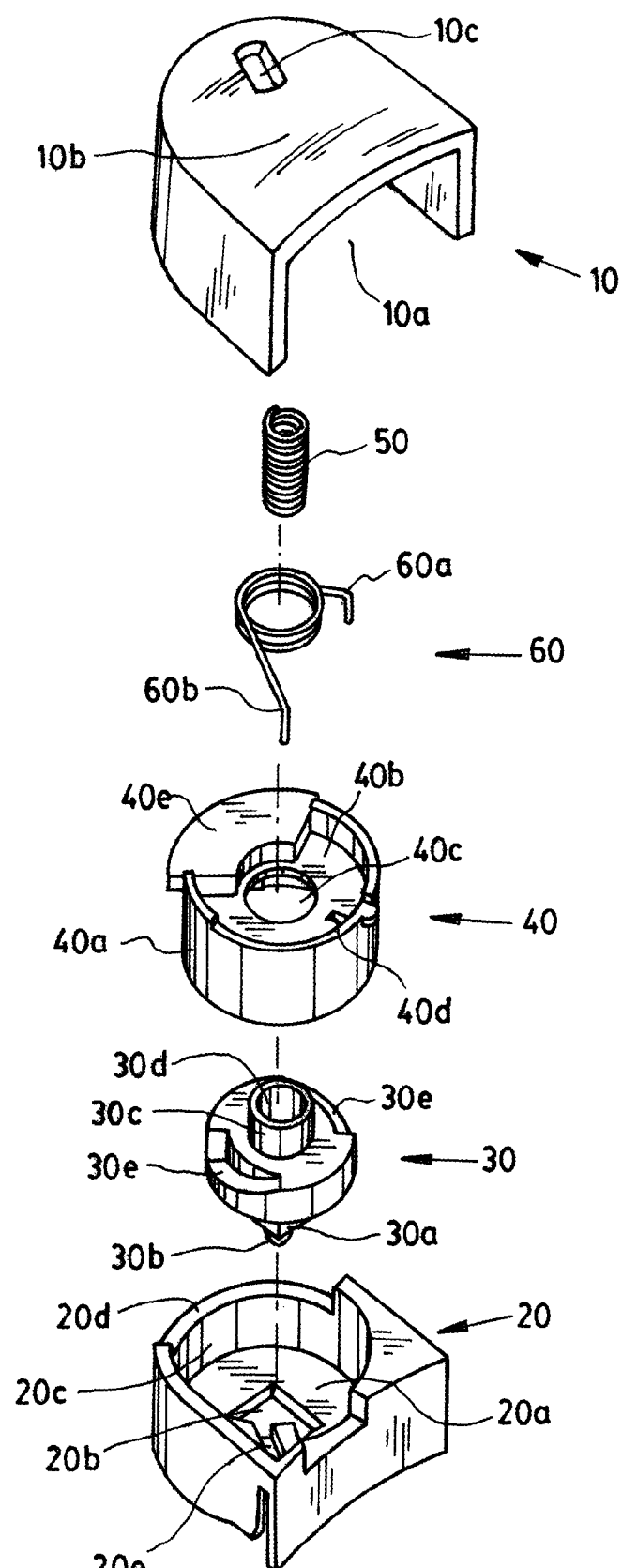
FIG. 1 is an exploded view of a device for sensing gap variation according to the invention.
Figure 2:
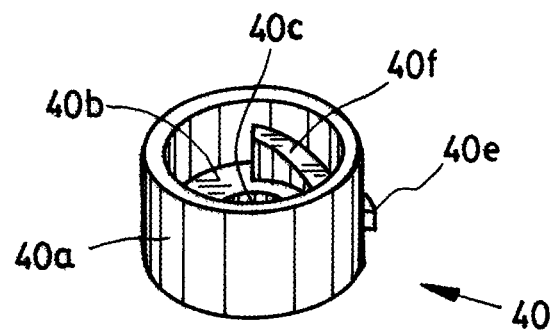
FIG. 2 is a perspective view of the rotational unit but viewed from an angle opposing that shown in FIG. 1.
Figure 3:
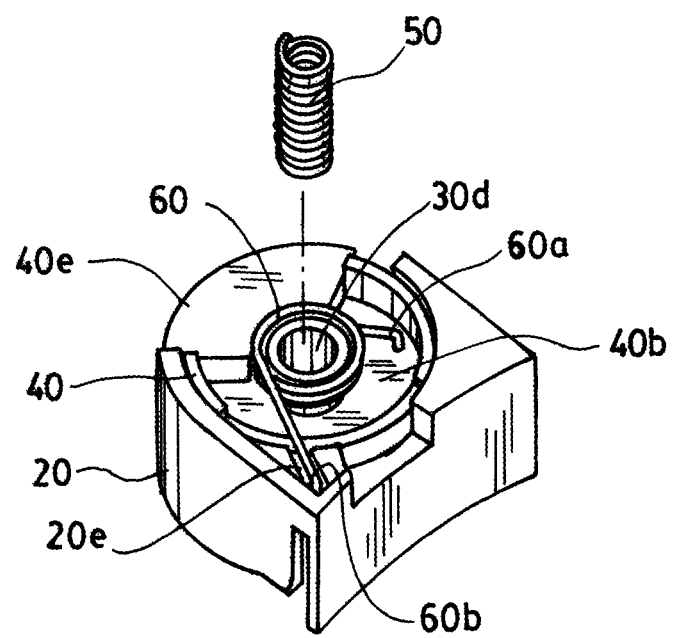
FIG. 3 is a perspective view of major components the device for sensing gap variation being assembled but without the cover and the first spring yet to assemble.

Referring to FIGS. 1 to 5, a device for sensing gap variation in accordance with the invention comprises the following components as discussed in detail below.

A cover 10 and a seat 20 consist of a housing with a sliding unit 30 and a rotational unit 40 provided therein. A helical first spring 50 is anchored in the sliding unit 30 and a torsion second spring 60 is anchored in the rotational unit 40 respectively.

The cover 10 has an open bottom and an open front. An internal space 10a is adapted to receive the seat 20 and assemble therewith. The cover 10 comprises a top 10b and a window 10c on the top 10b. Top end of the first spring 50 is urged against the top 10b from below. An individual my see the rotational unit 40 in the cover 10 through the window 10c.

The seat 20 or the cover 10 is adapted to attach to an object to be sensed. A cylindrical space is formed for housing the sliding unit 30 and the rotational unit 40 after assembling the seat 20 and the cover 10. The seat 20 comprises a bottom 20a, an opening 20b on the bottom 20a, a peripheral wall 20c, a recess 20d on top edge of the wall 20c, and a channel 20e raised on the bottom 20a.

The sliding unit 30 is slidably seated on the opening 20b (i.e., up and down movements). The sliding unit 30 comprises a bottom projection 30a, a probe 30b extending downward from the projection 30a, a top cylinder 30c having a receptacle 30d, and two opposite cavities 30e on the periphery. The projection 30a is fitted in the opening 20b. The probe 30b may contact the object to be sensed therebelow.

The cylindrical rotational unit 40 comprises a peripheral wall 40a, a rim 40b extending inward from an inner surface, a central hole 40c defined by the rim 40b, an opening 40d on the rim 40b, a display plate 40e on the rim 40b, and two opposite guide protrusions 40f on the lower portion of the inner surface opposing the display plate 40e. The rotational unit 40 is put on the sliding unit 30 with the wall 40a rotatably fitted in the wall 20c, the cylinder 30c passing through the hole 40c, and the upper portion of the sliding unit 30 complementarily engaged with the lower portion of the rotational unit 40 (see FIG. 4).

One bend end 60a of the second spring 60 is inserted into the opening 40d for anchoring. The display plate 40e is rested on the recess 20d and is disposed under the window 10c by a distance. A pattern, different indicia, or different colors may be printed on the display plate 40e for gap indication purposes.

The first spring 50 is anchored in the receptacle 30d and urged against the top 10b of the cover 10 from below. Thus, a downward force is exerted on the sliding unit 30. And in turn, the probe 30b may exert a force on the object to be sensed therebelow.

Figure 4:
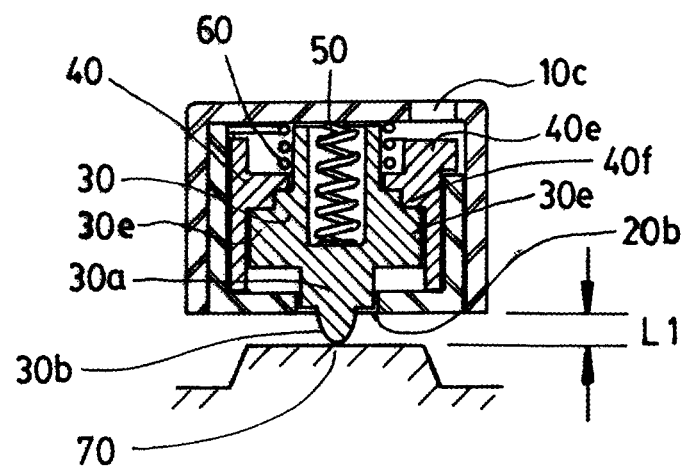
FIG. 4 is a longitudinal sectional view of the fully assembled device for sensing gap variation.

The second spring 60 is put on the cylinder 30c and has the bent other end inserted into the channel 20e for anchoring. The guide protrusions 40f are complementarily engaged with the cavities 30e. Force exerted by the first spring 50 for moving the sliding unit 30 upward or downward is greater than that exerted by the second spring 60 on the rotational unit 40 for moving the sliding unit 30 upward or downward.eb; normal As shown in FIG. 4, the device for sensing gap variation (e.g., the cover 10 or the seat 20) is adhered to a subject object (not shown) and a gap between the bottom of the cover 10 and a contact (i.e., the object to be sensed) 70 is labeled as L1. The projection 30*a* is completely retracted into the opening 20*b* and a portion of the probe 30*b* is also retracted into the opening 20*b*. The sliding unit 30 is pushed downward by the first spring 50. The rotational unit 40 is adapted to rotate because it is retained by the second spring 60.

Figure 5:
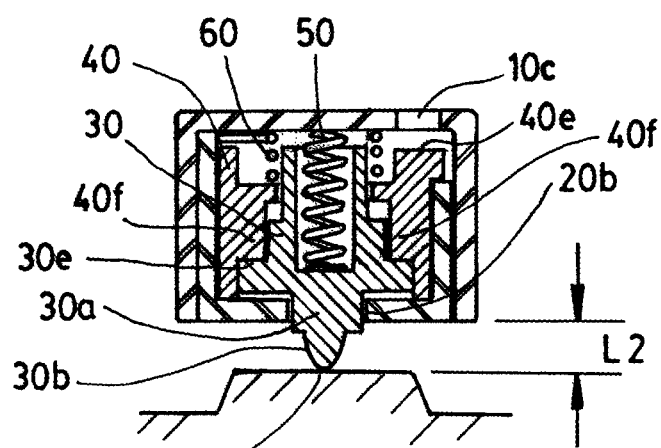
FIG. 5 is a view similar to FIG. 4 with the device for sensing gap variation being activated for gap measurement.

As shown in FIG. 5, a gap between the bottom of the cover 10 and the contact (i.e., the object to be sensed) 70 is increased and labeled as L2. And in turn, the cover 10, the seat 20, and the rotational unit 40 move upward with the expanding first spring 50 exerting a downward force on the sliding unit 30. Thus, a portion of the projection 30*a* projects out of the opening 20*b*, the probe 30*b* completely projects out of the opening 20*b*, portions of the guide protrusions 40*f* engaged with the cavities 30*e* are changed due to movement of the guide protrusions 40*f* along the cavities 30*e*. Hence, the rotational unit 40 rotates a small angle (see FIGS. 4 and 5). Therefore, an individual may see different portions of the pattern (or different indicia or different colors) on the display plate 40*e* through the window 10*c*. In brief, a viewing through the window 10*c* can determine whether there is a gap variation between a subject object and an object to be sensed.

While the invention has been described in terms of preferred embodiments, those skilled in the art will recognize that the invention can be practiced with modifications within the spirit and scope of the appended claims.

What is claimed is:
1. A sensing device comprising:
a cover having a window;
a seat assembled with the cover and comprising a bottom first opening, a peripheral wall, a recess on the wall, and a bottom channel;
a sliding unit comprising a bottom projection fitted in the first opening, a probe extending from the projection, a hollow cylinder, and two opposite cavities on a periphery;
a cylindrical rotational unit comprising a rim extending inward from an inner surface, a second opening on the rim, a display plate on the rim, and two opposite guide protrusions on an inner surface opposing the display plate wherein indications are printed on the display plate, and the rotational unit is rotatably put on the sliding unit with the cylinder passing through the rim, the display plate being rested on the recess, and the guide protrusions being engaged with the cavities;
a first biasing member disposed in the cylinder; and
a second biasing member put on the cylinder and having one end fastened in the second opening and the other end fastened in the channel;
wherein a gap variation between the seat and a point being in contact with the probe causes the first spring to expand to push the sliding unit further away from the cover and move the guide protrusions along the cavities, thereby rotating the rotational unit with the indications viewed through the window being changed.

* * * * *